United States Patent [19]

Chopinet

[11] Patent Number: 4,835,122

[45] Date of Patent: May 30, 1989

[54] GLASS FIBERS RESISTANT TO BASIC MEDIA AND THEIR APPLICATION TO REINFORCING OF CEMENT

[75] Inventor: Marie-Hélène Chopinet, Paris, France

[73] Assignee: Vetrotex Saint-Gobain, Hamberv, France

[21] Appl. No.: 823,429

[22] Filed: Jan. 28, 1986

[30] Foreign Application Priority Data

Feb. 12, 1985 [FR] France ............................ 85 01936

[51] Int. Cl.$^4$ .................. C03C 13/00; C03C 13/02; C04B 14/42; C04B 14/44
[52] U.S. Cl. ........................... 501/35; 501/38; 501/99
[58] Field of Search ............... 501/35, 38; 156/99

[56] References Cited

U.S. PATENT DOCUMENTS

| | | | |
|---|---|---|---|
| 3,861,926 | 1/1975 | Irlam et al. ........................ | 501/38 |
| 4,014,705 | 3/1977 | Yale ................................... | 501/38 |
| 4,140,533 | 2/1979 | Ohtomo et al. .................... | 501/38 |
| 4,224,627 | 9/1980 | Powell et al. ...................... | 501/79 |
| 4,330,628 | 4/1982 | Cockram et al. .................. | 501/38 |
| 4,345,037 | 8/1982 | Fyles et al. ........................ | 501/38 |

FOREIGN PATENT DOCUMENTS

| | | |
|---|---|---|
| 2451347 | 4/1980 | France . |
| 54-14428 | 2/1979 | Japan ................................. 501/38 |
| 912703 | 3/1982 | U.S.S.R. ............................ 501/38 |
| 2071081 | 5/1980 | United Kingdom . |

OTHER PUBLICATIONS

Chemical Abstracts, vol. 97, 1982, pp. 317, 318, No. 97: 77341x.

Primary Examiner—Mark L. Bell
Attorney, Agent, or Firm—Pennie & Edmonds

[57] ABSTRACT

The invention relates to glass fiber compositions and fibers having use as a reinforcement element of cement-base products. As such, the composition is able to resist attack of strongly basic media.

The fibers of the invention comprise the following constituents, in proportions by weight:
$SiO_2$—56 to 68%,
$ZrO_2$—14 to 17%,
$Na_2O$—12 to 20%,
$K_2O$—0 to 8%,
$Al_2O_3$—1 to 9%, and wherein the sum of $Na_2O$ and $K_2O$ is between 14 and 22%, and wherein the sum of $SiO_2$ and $Al_2O_3$ is less than 70%.

16 Claims, 1 Drawing Sheet

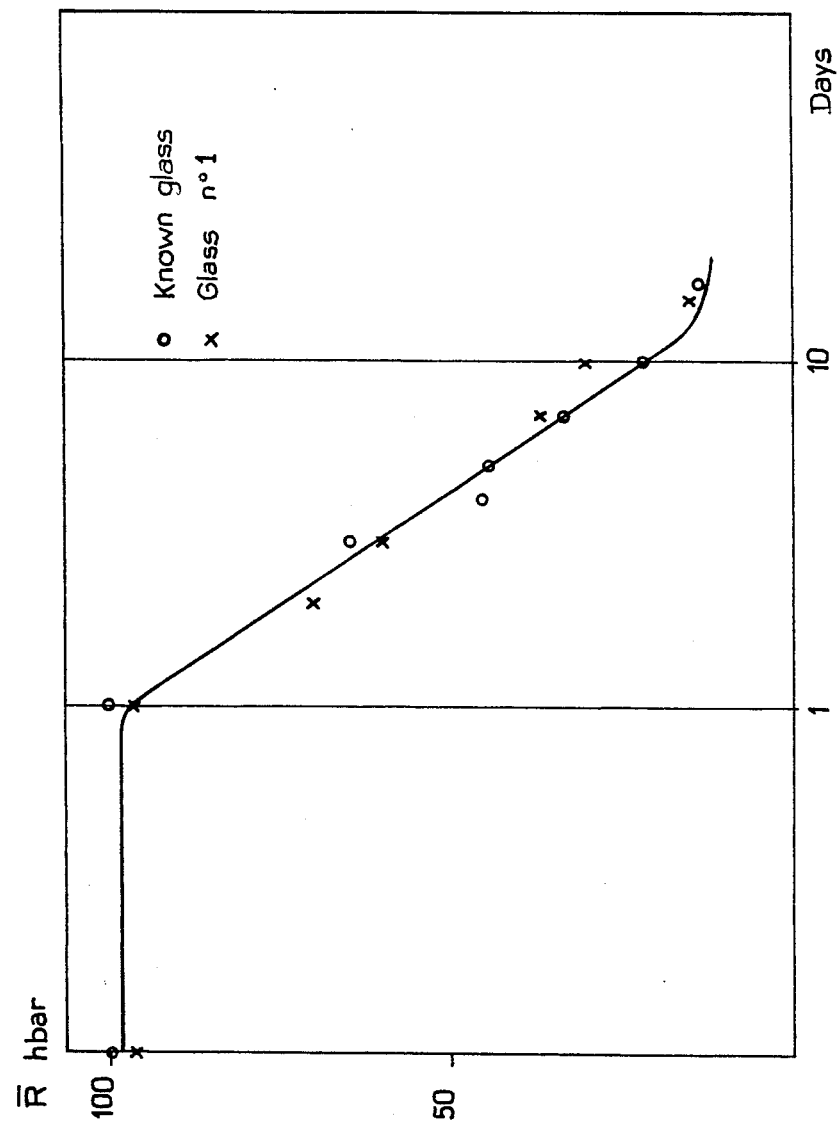

GLASS FIBERS RESISTANT TO BASIC MEDIA AND THEIR APPLICATION TO REINFORCING OF CEMENT

DESCRIPTION

1. Technical Field

This invention relates to glass fiber compositions. The compositions of the invention are able to resist the attack of strongly basic media and, as such, may find use as a reinforcement element of cement-base products.

2. Background of the Invention

Glass fibers comprise the material of choice in use in the improvement of mechanical properties of numerous composite products. This is because the glass fibers, when compared with other organic or inorganic fibers have particularly high characteristics of ultimate tensile strength and modulus of elasticity. The glass fibers that have been compared are those that are mechanically drawn from molten glass flowing through the orifices of a spinneret heated by Joule effect.

The glass fibers, in addition to exhibiting the aforementioned mechanical properties, should also exhibit an excellent chemical resistance when used in the reinforcement of a cement-base product. It is, however, possible to minimize attack and corrosion of the glass fiber in the presence of a saturated $Ca(OH)_2$ solution impregnating the cement matrix by increasing the resistance of the same.

According to the prior art, the resistance of glass fibers may be increased greatly by using glass compositions having a high content of zirconia ($ZrO_2$). The use of zirconia in glass compositions is disclosed in British Pat. No. 1,243,972 and U.S. Pat. No. 3,861,926.

While the use of zirconia in glass compositions has been found to increase resistance in regard to basic media, it has also been found that zirconia in glass composition gives rise to certain drawbacks. To this end, the presence of the oxide in glass fibers increases viscosity of the glass fibers and considerably raises the upper devitrification temperature (UDT). The temperature ($T_F$) for drawing the glass fibers also increases as the glass fibers become more viscous. The change in the temperature for drawing glass fibers under circumstances that the viscosity of the glass fibers increases may not, however, be as sudden as the change in the upper devitrification temperature. Further, when the zirconia content increases, the difference between these temperatures may become increasingly small and the upper devitrification temperature can even become greater than the drawing temperature. With the latter condition, the risks of devitrification may be too great to consider production of glass fibers in an industrial installation.

These risks may be reduced by adding one or more additional oxides to the base composition. The essential role of the additional oxides is to lower the upper devitrification temperature, and even to change the nature of the crystalline species that appears at the highest temperature.

Experience has shown that industrial scale production of continuous glass fibers can be considered only if certain conditions are met by the glasses providing a source for the glass fibers. In particular, one condition to be met concerns the temperature difference between the temperature corresponding approximately to viscosity $\eta$, such as log $\eta = 2.5$ and the upper devitrification temperature which should be at least equal to 80° C., and preferably at least equal to 100° C. Moreover, it is desirable that the drawing temperature corresponding approximately to viscosity $\eta$, such as log $\eta = 2.8$, be less than 1480° C., and preferably less than or equal to 1400° C. By adherence to this condition a rapid wear of the platinum alloy spinnerets, generally used to obtain continuous fibers, may be avoided.

SUMMARY AND BEST MODE FOR CARRYING OUT THE INVENTION

An important aspect of the invention concerns the mechanical drawing of glass fibers that meet the conditions previously set out, at a cost that is as low as possible.

Another aspect of the invention concerns the glass fiber composition which comprises a small number of constituents including zirconia and the glass fibers which exhibit an excellent resistance to basic media. The constituents, with the exception of zirconia are relatively inexpensive thereby to keep costs down, and the zirconia which is more expensive is introduced only in a moderate amount.

According to the invention the composition comprises the oxides set out below, in the indicated proportions by weight of $SiO_2$—56 to 68%,
$ZrO_2$—14 to 17%,
$Na_2O$—12 to 20%,
$K_2O$—0 to 8%,
$Al_2O_3$—1 to 9%, and wherein the sum of $Na_2O + K_2O$ is between 14 and 22%, and the sum of $SiO_2 + Al_2O_3$ is less than 70%.

An excessive increase in the viscosity of the glass may be avoided by maintaining the summations of constituents within the limits set out. If, under the circumstances of the composition, both the $SiO_2$ and $Al_2O_3$ are to play a traditional role of forming the vitreous network, it should be observed that the $Al_2O_3$ should be introduced in only a moderate amount. To this end and within the context of the invention, the oxide of aluminum may increase the risks of devitrification. The oxide of aluminum is advantageously introduced by a complex vitrifiable raw material which contributes other oxides, such as $SiO_2$, $Na_2O$, $K_2O$. The use of such a raw material, which by itself forms a combination of oxides, exhibits the advantage of facilitating the melting of the vitrifiable material. The advantage may be considerable in the case of glasses that are viscous by nature. In addition, the raw material is not expensive.

It has been found that fiber glasses belonging to the field heretofore defined may be produced on an industrial scale under circumstances that the silica content is between 58 and 66%, the alumina content is between 1 and 7.5%, and the sum of the two contents is no greater, and preferably less than 68%. This make up of the composition has been found to exhibit a temperature difference between the temperature corresponding to log $\eta = 2.5$ and the upper devitrification temperature greater than 100° C.

The chemical resistance of glass fibers buried in a cement-base matrix generally may be improved by the joint action of $ZrO_2$ and one or more additional oxides. A widely used combination of oxides, and a combination considered to be economical, includes $ZrO_2$ and one or more alkaline-earth oxides. These latter oxides, however, may be the genesis of increased risk of devitrification.

According to the invention glass fibers exhibiting an excellent resistance to basic media may be drawn from a composition despite the fact that the composition contains only a single oxide, namely zirconia active with regard to the increase of resistance. This is the case even though the oxide is introduced in a moderate amount. However, by keeping the zirconia within the limits set out, the invention advantageously avoids excessively increasing the viscosity of the glasses and the risks of devitrification.

These advantages of the invention render it possible to use only $Na_2O$ and $K_2O$ in the adjustment of the viscosity of the glass so that the drawing temperature for the glass fibers will remain less than or no more than equal to 1480° C. As such, there will be a sufficient temperature difference between the drawing temperature and the upper devitrification temperature.

While it has been found that the established aims may be met by the use of $Na_2O$, only, it is nevertheless considered advantageous to introduce $K_2O$ into the glasses of the invention. The oxide will be introduced in a rather slight amount and it has been found that the introduction of $K_2O$ is especially advantageous under conditions that the sum of the alkaline oxides exceeds 19%. Introduction of $K_2O$ into the composition has certain advantages, particularly that of using complex vitrifiable raw materials containing, in particular, $Na_2O$ and $K_2O$.

The glasses of the invention exhibit excellent characteristics particularly when the percentage by weight of $Na_2O$ is maintained between 13 and 19%, and when the percentage by weight of $K_2O$ does not exceed 6%. It is particularly desirable to maintain the sum of $Na_2O$ and $K_2O$ between 15 and 20%.

A most advantageous composition within this field may comprise the oxides set out below, in the indicated proportions by weight of $SiO_2$—58 to 66%,
$ZrO_2$—15 to 16%,
$Na_2O$—13 to 19%,
$K_2O$—1 to 6%,
$Al_2O_3$—1 to 7%.

The characteristics of the composition of glasses of the invention may be appreciated by reference to the table, below, including the several examples. These experimental results make evident an advantageous use of the glass fibers of the invention in the reinforcement of cement-base products.

The aptitude of glass fibers drawn from a composition may be evaluated by measuring the development of the ultimate tensile strength of the glass fibers within the medium that is reinforced. In the environment of a cement, the ultimate tensile strength of the glass fibers may be evaluated after a more or less long stay in a suspension of Portland cement in water. The ratio of the amounts of water and Portland cement is chosen so that the pH of the suspension is equal to 12.6. Testing of the glass fibers, immersed in the suspension maintained at a temperature of 80° was carried out during aging times spread between 1 and 17 days. The graph (FIG. 1) shows a development of ultimate tensile strength of glass fibers having a composition which corresponds to the composition of the Table, see column 1 (No. 1). The graph also shows, for purposes of illustration, a development of ultimate tensile strength of glass fibers of a known glass. The data relating to the known glass and the glass (No. 1) was obtained under the same conditions, and was subjected to substantially the same agings. The known glass, having a demonstrated aptitude in the reinforcement of cement, is described in French Pat. No. 2,053,211 and marketed under the trademark "CEMFIL."

The aging of the two glasses was practically identical. Further, as illustrated by the graph, the ultimate tensile strengths of glass (No. 1) and the known glass may substantially be represented by a single curve. To the extent that the method used reveals the behavior of the glass as a reinforcement in cement, the aptitude of the glass fiber corresponding to glass (composition No. 1) is certainly comparable to that of the "CEMFIL" fiber.

According to the invention, glass fibers having the above composition may be used either alone or in association with other organic or inorganic fibers, such as cellulose fibers or asbestos fibers, and may be used to reinforce cement-base products. The glass fibers, according to the invention, may be incorporated in the form of continuous yarns or cut yarns, such as, for example, rovings, ribbons, mats, fabrics, and so forth, in the cement matrix. In this application, the term "cement" should be understood to designate ordinary hydraulic cements, such as Portland cement. The term "cement-base product" should be understood to designate all products formed from mixture of cement and aggregates or other materials, such as sands, mica, ultrafine silica, ashes, and so forth.

I claim:

1. A continuous glass fiber consisting essentially of, in proportions by weight:

$SiO_2$—56 to 68%,
$ZrO_2$—14 to 17%,
$Na_2O$—12 to 20%,
$K_2O$—0 to 8%,

TABLE

|  | n°1 | n°2 | n°3 | n°4 | n°5 | n°6 | n°7 | n°8 |
|---|---|---|---|---|---|---|---|---|
| $SiO_2$ | 58,5% | 61,0% | 61,8% | 61,8% | 65,0% | 63,0% | 67,0% | 59,0% |
| $ZrO_2$ | 15,0% | 15,0% | 14,6% | 14,6% | 14,0% | 17,0% | 16,0% | 16,0% |
| $Na_2O$ | 16,5% | 16,9% | 16,6% | 13,3% | 12,0% | 19,0% | 14,0% | 16,0% |
| $K_2O$ | 2,8% | 2,1% | — | 3,1% | 8,0% | — | 1,0% | 6,0% |
| $Al_2O_3$ | 7,2% | 5,0% | 7,3% | 7,2% | 1,0% | 1,0% | 2,0% | 3,0% |
| t°(°C.) pour log η |  |  |  |  |  |  |  |  |
| = 3 | 1343 | 1324 | 1399 | 1421 | 1435 | 1327 | 1411 | 1311 |
| = 2,8 | 1378 | 1360 | 1438 | 1460 | 1475 | 1360 | 1450 | 1345 |
| = 2,5 | 1434 | 1421 | 1504 | 1522 | 1521 | 1417 | 1512 | 1403 |
| UTD(°C.) | 1330 | — | 1260 | 1400 | — | 1250 | — | 1340 |
| Δ(°C.) | 104° C. | >100° C. | 244° C. | 122° C. | >100° C. | 157° C. | >100° C. | 63° C. |

UDT = Upper devitrification temperature
Δ = temperature (log η = 2.5 - UDT $Al_2O_3$—1 to 9%,
and wherein the sum of the proportions of $Na_2O$ and $K_2O$ is between 14 and 22%, and the sum of the proportions of $SiO_2$ and $Al_2O_3$ is less than 70%.

2. The glass fiber of claim 1 wherein the percentage of $SiO_2$ is between 58 and 66%, and the percentage of $Al_2O_3$ is between 1 and 7.5%.

3. The glass fiber of claim 2 wherein the sum of the proportions of $SiO_2$ and $Al_2O_3$ is no more than equal to 68%.

4. The glass fiber of claim 1, 2 or 3 wherein the percentage of $Na_2O$ is between 13 and 19% and the percentage of $K_2O$ is less than or equal to 6%.

5. The glass fiber of claim 4 wherein the sum of the proportions of $Na_2O$ and $K_2O$ is between 15 and 20%.

6. The glass fiber of claim 1, 2 or 3 consisting essentially of, in proportions by weight:
$SiO_2$—58 to 66%,
$ZrO_2$—15 to 16%,
$Na_2O$—13 to 19%,
$K_2O$—0 to 6%,
$Al_2O_3$—1 to 7%.

7. A continuous glass fiber consisting essentially of, in proportions by weight:
$SiO_2$—58 to 66%,
$ZrO_2$—15 to 16%,
$Na_2O$—13 to 19%,
$K_2O$—0 to 6%,
$Al_2O_3$—1 to 7%,
and wherein the sum of the proportions of $Na_2O$ and $K_2O$ is between 14 and 22% and the sum of the proportions of $SiO_2$ and $Al_2O_3$ is less than 70%.

8. The glass fiber of claim 7 wherein the sum of $SiO_2$ and $Al_2O_3$ is no more than equal to 68%.

9. The glass fiber of claim 8 wherein the sum of $Na_2O$ and $K_2O$ is between 15 and 20%.

10. A glass fiber reinforced cement-based product wherein at least a portion of said reinforcing fibers are continuous glass fibers consisting essentially of, in proportions by weight:
$SiO_2$—56 to 68%,
$ZrO_2$—14 to 17%,
$Na_2O$—12 to 20%,
$K_2O$—0 to 8%,
$Al_2O_3$—1 to 9%,
and wherein the sum of the proportions of $Na_2O$ and $K_2O$ is between 14 and 22% and the sum of the proportions of $SiO_2$ and $Al_2O_3$ is less than 70%.

11. A glass fiber consisting essentially of, in proportions by weight:
$SiO_2$—56 to 68%,
$ZrO_2$—14 to 17%,
$Na_2O$—12 to 20%,
$K_2O$—0 to 8%,
$Al_2O_3$—1 to 9%,
wherein the sum of the proportions of $Na_2O$ and $K_2O$ is between 14 and 22%, the sum of the proportions of $SiO_2$ and $Al_2O_3$ is less than 70%, and the difference between a temperature corresponding to log n=2.5 and an upper devitrification temperature is at least about 80° C. and a drawing temperature, corresponding to log n=2.8, is less than or equal to 1480° C.

12. The fiber of claim 11 wherein the proportion of $SiO_2$ is between 58 and 66% the proportion of $Al_2O_3$ is between 1 and 7.5%, and the sum of the proportions of $SiO_2$ and $Al_2O_3$ is less than or equal to 68%.

13. The fiber of claim 11 wherein the proportion of $Na_2O$ is between 13 and 19% the proportion of $K_2O$ is less than or equal to 6%, and the sum of the proportions of $Na_2O$ and $K_2O$ is between 15 and 20% by weight.

14. A continuous glass fiber consisting essentially of, in proportions by weight:
$SiO_2$—58 to 66%,
$ZrO_2$—15 to 16%,
$Na_2O$—13 to 19%,
$K_2O$—0 to 6%,
$Al_2O_3$—1 to 7%,
wherein the sum of the proportions of $Na_2O$ and $K_2O$ is between 14 and 22%, the sum of the proportions of $SiO_2$ and $Al_2O_3$ is less than 70%, and the difference between a temperature corresponding to log n=2.5 and an upper devitification temperature is at least about 80° C., and wherein a drawing temperature corresponding to log n=2.8 is less than or equal to 1480° C.

15. The fiber of claim 14 wherein the sum of the proportions of $SiO_2$ and $Al_2O_3$ is less than or equal to 68%, and wherein the sum of the proportions of $Na_2O$ and $K_2O$ is between 15 and 20% by weight.

16. A glass fiber reinforced cement-based product wherein at least a portion of said reinforcing fibers are the glass fibers of one of claims 9, 10, 7–9 or 11 through 15.

* * * * *